United States Patent
Wang

(10) Patent No.: US 10,288,470 B2
(45) Date of Patent: May 14, 2019

(54) METHOD FOR OPERATING A FLOWMETER AND FLOWMETER

(71) Applicant: Krohne AG, Basel (CH)

(72) Inventor: Tao Wang, Rough Common (GB)

(73) Assignee: KROHNE AG, Basel (CH)

( * ) Notice: Subject to any disclaimer, the term of this patent is extended or adjusted under 35 U.S.C. 154(b) by 58 days.

(21) Appl. No.: 15/651,172

(22) Filed: Jul. 17, 2017

(65) Prior Publication Data

US 2018/0017428 A1 Jan. 18, 2018

(30) Foreign Application Priority Data

Jul. 18, 2016 (DE) .................. 10 2016 113 200

(51) Int. Cl.
*G01F 25/00* (2006.01)
*G01F 1/00* (2006.01)
*G01F 1/05* (2006.01)
*G01F 1/56* (2006.01)

(52) U.S. Cl.
CPC ............. *G01F 25/003* (2013.01); *G01F 1/00* (2013.01); *G01F 25/0007* (2013.01); *G01F 1/05* (2013.01); *G01F 1/56* (2013.01)

(58) Field of Classification Search
CPC .................................................. G01F 25/003
USPC ....................................................... 702/100
See application file for complete search history.

(56) References Cited

U.S. PATENT DOCUMENTS

| 4,864,512 A | 9/1989 | Coulson et al. | |
|---|---|---|---|
| 5,824,879 A | 10/1998 | Brown | |
| 6,705,172 B1 | 3/2004 | Deppe et al. | |
| 6,796,189 B1 * | 9/2004 | Umekage | G01F 1/66 73/861.27 |
| 6,981,424 B2 * | 1/2006 | Henry | G01F 1/74 73/861.356 |
| 9,512,709 B2 * | 12/2016 | Henry | E21B 21/063 |
| 9,562,427 B2 * | 2/2017 | Henry | E21B 21/063 |
| 2002/0078760 A1 * | 6/2002 | Matsushima | G01F 1/667 73/861.29 |
| 2018/0073902 A1 * | 3/2018 | Gonzaga | G01F 1/34 |

OTHER PUBLICATIONS

"Error propagation." Chemistry LibreTexts . . . chem.libretexts.org. Nov. 7, 2018 <https://chem.libretexts.org>.*

(Continued)

*Primary Examiner* — Hien D Khuu
(74) *Attorney, Agent, or Firm* — David S. Safran; Roberts Mlotkowski Safran Cole & Calderon, P.C.

(57) ABSTRACT

A method for operating a flowmeter for measuring the flow of a flowing medium through a pipe, wherein the flowmeter has a measuring unit for determining individual measured values of the flow and an error unit for determining the measurement uncertainty of the individual measured values. Determination of the individual measured values is carried out using a measuring frequency. A method for operating a flowmeter, which improves the quality of measurement is achieved in that a present measurement uncertainty is determined for each individual measured value by the error unit and by the measurement uncertainties from static and dynamic error sources being linked to one another by error propagation for determining the present measurement uncertainty.

12 Claims, 2 Drawing Sheets

(56) References Cited

OTHER PUBLICATIONS

"Error propagation." A Dictionary of Computing . . . Encyclopedia. com. Nov. 7, 2018 <https://www.encyclopedia.com>.*
R.B. Abernethy, et al., ASME Measurement Uncertainty, Journal of Fluids Engineering, Jun. 1985, vol. 107, pp. 161-164.
Norm ISO 5168, Measurement of fluid flow—Procedures for the evaluation of uncertainties, Second Edition, Jun. 15, 2005, pp. 1-65.
R.J. Moffat, Contributions to the Theory of Single-Sample Uncertainty Analysis, Journal of Fluids Engineering, Jun. 1982, vol. 104, pp. 250-258.

* cited by examiner

METHOD FOR OPERATING A FLOWMETER AND FLOWMETER

BACKGROUND OF THE INVENTION

Field of the Invention

The invention relates to a method for operating a flowmeter for measuring the flow of a flowing medium through a pipe, wherein the flowmeter has a measuring unit for determining individual measured values of the flow and an error unit for determining the measurement uncertainty of the individual measured values, wherein the determination of the individual measured values is carried out using a measuring frequency.

Furthermore, the invention relates to a flowmeter for measuring the flow of a flowing medium through a pipe, having a measuring unit for determining individual measured values of the flow and having an error unit for determining the measurement uncertainty of the individual measured values, wherein the determination of the individual measured values is carried out using a measuring frequency.

Description of Related Art

Each measurement of physical measured variables is always afflicted with a measurement uncertainty, which is ascribed to the imperfection of the measuring device and the imperfection of the measurement operation. The information about the measurement uncertainty of a measured value allows the user to assess the reliability of the displayed measured value, and thus, the quality of the measurement. Furthermore, the information about measurement uncertainty allows for different measurements from the same measuring device to be compared to one another as well as for measurements from different measuring devices or in respect to reference values and standards to be compared.

A specification for an internationally consistent procedure for determining and expressing the measurement uncertainty is to be taken from "Guide to the Expression of Uncertainty in Measurement" (JCGM, 2008). According to this guide, the measurement uncertainty of measured values can be determined in the following two manners:

On the one hand, the determination of the measurement uncertainty can be carried out using statistical analysis, in detail using the determination of the standard deviation of the measured values over a limited time. The statistical distribution of individual measured values and, thus, the statistical measurement uncertainty can be determined using this method. All disturbance variables that influence the measured value or the measurement uncertainty are thereby automatically taken into account. However, since the determination of a measurement uncertainty by statistical analysis is carried out over a limited time, a more exact statement about the present measurement uncertainty of an individual measured value cannot be made.

On the other hand, the measurement uncertainty can also be theoretically examined, wherein a total measurement uncertainty is determined in that individual measurement uncertainties from different error sources independent of one another are linked by error propagation.

A method for displaying a measured value and determining measurement uncertainty as well as a corresponding measuring device for performing the method are known from the U.S. Pat. No. 4,864,512.

SUMMARY OF THE INVENTION

The present invention relates to the field of flow measurement technology. It is known from the prior art to provide a maximum measurement uncertainty together with the measured value in manufacturer's data or during a measurement operation. The reliability of measured values is thus, however, always as large as the given maximum measurement uncertainty. Furthermore, it is not taken into account, in this manner, that the variation of external operating parameters influences the measured value as well as the measurement uncertainty.

Based on the above-described prior art, the object of the present invention is to provide a method for operating a flowmeter, which improves the quality of the measurement. Furthermore, the object of the invention is to provide a corresponding flowmeter.

This object is achieved according to a first teaching of the invention by a method mentioned in the introduction in that a present measurement uncertainty is determined for each individual measured value by the error unit and that the measurement uncertainties from static and dynamic error sources are linked to one another by error propagation for determining the present measurement uncertainty.

According to the invention, it has been seen that a determination of the measurement uncertainty can be carried out in real time, in that each individual measured value is assigned a present measurement uncertainty. Thereby, the present measurement uncertainty is re-determined for each individual measured value. In an advantageous manner, it is taken into account that the error sources in the course of a measurement also vary, wherein the dynamics of the error sources also affect the extent of the measurement uncertainty.

According to the invention, the present measurement uncertainty is determined using error propagation. Such an examination of errors is always to be carried out when several error-afflicted variables independent of one another are to be taken into account in the determination of the measurement uncertainty.

In addition to determining the individual measured values using a measuring frequency, the measurement uncertainty is determined using the same measuring frequency and, thus, in real time according to the invention. Thereby, the determination of the present measurement uncertainty can be carried out essentially simultaneously with the determination of the individual measured values of the flow. Alternatively, the determination of the present measurement uncertainty can also be carried out temporally after the determination of the individual measured values of the flow, however, within the same period of the measuring frequency.

In the scope of the present invention, a static error source is understood as each error source having a constant relative or absolute value of the measurement uncertainty that is taken into account during measurement. In contrast, dynamic error sources are such that they vary during a measurement and their relative or absolute value of measurement uncertainty also varies.

The method according to the invention allows the user to assess the reliability of the individual measured values of a measurement using the exact expression of a present measurement uncertainty in respect to an individual measured value, which, overall, improves the quality of measurement.

According to a first implementation of the method, the flowmeter measures the volume flow or the mass flow of the medium. For example, the flowmeter can be a magnetic-inductive flowmeter or an ultrasound flowmeter or a Coriolis mass flowmeter or a vortex flowmeter.

According to a further implementation of the method according to the invention, the measurement uncertainty of calibration and/or the measurement uncertainty of reproducibility and/or the measurement uncertainty of long-term reproducibility and/or the measurement uncertainty of linearity of the flowmeter is/are used as static error source in determining the present measurement uncertainty. Information about the extent of this measurement uncertainty is normally found on the calibration certificate of the flowmeter. Alternatively, the above-mentioned measurement uncertainties of calibration and/or reproducibility and/or long-term reproducibility and/or linearity can also be based on experimental data.

As a general rule, flowmeters are calibrated before or during start-up with a standard medium under reference conditions, i.e., at a given reference temperature and reference pressure, wherein this process is also subject to calibration uncertainty. On the one hand, the measurement uncertainty is ascribed to the error of the standard medium and, on the other hand, to the imperfection of the measurement process.

The reproducibility of immediately subsequent measurements as well as long-term reproducibility under the same measuring conditions are also subject to a measurement uncertainty based on the imperfection of the medium to be measured as well as the imperfection of the measurement process.

A further measurement uncertainty results from the determination of the linearity of the flowmeter.

According to a further implementation, the zero point stability of the flowmeter and/or the variation of at least one operating parameter, such as temperature or pressure, for example, is/are used as dynamic error source in determining the present measurement uncertainty.

According to the definition, zero point stability is the characteristic of a measuring device to retain its zero point, even when external operating parameters change, in particular the operating temperature. The influence of temperature and/or pressure changes on the zero point of the flowmeter is usually to be taken from the manufacturer's data.

In addition to shifting the zero point, changes in the operating parameters, such as the pressure and/or the temperature, can also affect the medium itself and/or the flowmeter. Preferably, the effects of the changes of at least one of the operating parameters on the measured value and/or on the measurement uncertainty are stored in the error unit as experimental data. Additionally, changes in the operating parameter due to a correction of the parameter, determined by reference conditions, are to be taken into account.

It is particularly preferred that all above-mentioned error sources are taken into account in determining the present measurement uncertainty of an individual measured value of the flowmeter, whereby a reliable statement can be made about the error margins in which the true measured value of the flow lies.

In the following, the determination of the present measurement uncertainty of an individual measured value is examined as an example, wherein the individual measured value of the flow is determined with a Coriolis mass flowmeter.

The pipe having a medium flowing through it or a tube having medium flowing through it is made to oscillate by an actuator for flow measurement. Sensors that detect a phase difference of the oscillations between the sensors are located on the inflow side and the outflow side of the tube, wherein the phase difference is ascribed to the mass flow. The phase difference is proportional to the mass flow.

The mass flow through the pipe can be accordingly determined in the following manner:

$$\dot{m} = C \cdot K_R \cdot (t_d - \overline{t_0})$$

Thereby, $K_R$ is the calibration factor, which is determined in the scope of calibration of the flowmeter under reference conditions, C is the correction factor that takes into account that the operating state deviates from the standard conditions of calibration, $t_d$ is the time offset of the oscillations between the sensors due to the flow of the medium, and $\overline{t_0}$ is the time offset between the sensors, wherein no medium is flowing through the pipe (offset).

After conversion of the equation, the result is $$\dot{m} = C \cdot (\dot{m} - \dot{m}_0),$$

wherein $\dot{m}_R$ is the mass flow without taking into account the deviation from the reference conditions, and $\dot{m}_0$ is the offset of the mass flow without flow of the medium.

The absolute measurement uncertainty of the mass flow can now be calculated according to error propagation in the following manner:

$$u_{\dot{m}} = \sqrt{\left(\frac{\delta \dot{m}}{\delta \dot{m}_R} u_{\dot{m}_R}\right)^2 + \left(\frac{\delta \dot{m}}{\delta \dot{m}_0} u_{\dot{m}_0}\right)^2 + \left(\frac{\delta \dot{m}}{\delta C} u_C\right)^2}$$

The relative measurement uncertainty of the mass flow results according to the following equation:

$$u_{\dot{m}_\%} = \frac{u_{\dot{m}}}{\dot{m}} = \sqrt{\left(\frac{u_{\dot{m}_R}}{\dot{m}_R - \dot{m}_0}\right)^2 + \left(\frac{u_{\dot{m}_0}}{\dot{m}_R - \dot{m}_0}\right)^2 + \left(\frac{u_C}{C}\right)^2}$$

Thereby, $u_{\dot{m}_R}$ is the respective measurement uncertainty of a flowmeter that is operated under reference conditions. This measurement uncertainty takes into account the measurement uncertainty of calibration and/or reproducibility and/or long-term reproducibility and/or the linearity of the flowmeter.

The measurement uncertainty $u_{\dot{m}_0}$ relates to the uncertainty of the zero point of the measuring device and, insofar, the zero point stability when the operating state deviates from the reference conditions.

The measurement uncertainty $u_C$ relates to the measurement uncertainty due to deviations of the operating state from the reference conditions. In particular, dynamic changes of the operating state, for example, the temperature, are taken into account at this point.

As already described, the manufacturer's data often indicate information in respect to the influences of the temperature on the zero point stability $u_{\dot{m}_0 T_f}$ as well as in respect to the influences of the pressure $u_{C_{P_f}}$ on the calibration factor.

If the temperature of the medium is $T_f$, then the additional measurement uncertainty is $u_{\dot{m}_0 T_f}$ due to the deviation of the temperature from the reference conditions $T_{f R_0}$ $$u_{\dot{m}_0 T_f} = k \cdot k_{\dot{m}_0 T_f} (T_f - T_{f R_0}) \cdot q_n$$

wherein k is dependent on the adoption of the statistical distribution of the measured value, for example in a rectangular distribution $k=1/\sqrt{3}$, and wherein $q_n$ is the measured value of the flow. If the pressure of the medium $p_f$ deviates from the reference pressure $p_{fR}$, then the additional measurement uncertainty is $$u_{C\%_{p_f}} = k \cdot k_{Cp_f}(p_f - p_{fR}).$$

The additional measurement uncertainties are then taken into account in the scope of error propagation in order to calculate the total uncertainty. The total uncertainty can be output either as an absolute or relative value.

According to a further advantageous implementation of the method according to the invention, the flowmeter has a display unit, wherein each individual measured value and the associated present measurement uncertainty are output via the display unit.

According to a further implementation, the measuring frequency lies between 20 and 500 Hz, preferably near 100 Hz. Due to the high measuring frequency, the determination of the flow with the present measurement uncertainty corresponds to a real time measurement.

In an advantageous manner, the flowmeter has at least one additional sensor unit for detecting at least one present operating parameter, wherein the sensor unit forwards the measured values of the present operating parameter at least to the error unit. Relevant operating parameters are, for example, the ambient temperature and/or the pressure. Such an external sensor unit can, for example, be comprised of a PT resistor. Alternatively, a corresponding sensor unit can be integrated in the error unit.

According to a further advantageous implementation, the flowmeter has an interface, via which the at least one present operating parameter, for example the temperature or pressure, is input and which forwards the present operating parameter to the error unit.

According to a further implementation of the method according to the invention, a maximum measurement uncertainty is set and the present measurement uncertainty is compared to the maximum measurement uncertainty. If the maximum measurement uncertainty is exceeded, a warning is issued. For example, the maximum measurement uncertainty can be set before start-up of the flowmeter or after maintenance. Preferably, the warning is also forwarded to the display unit and is issued by the display unit. The exceeding of a maximum measurement uncertainty can be an indication of a malfunction of the operating state.

According to a further implementation of the method, the flowmeter has a counter, wherein the counter outputs the total flow of a temporally limited measurement operation. In addition, the counter integrates the individual measured values over the amount of time of a measurement operation. Furthermore, according to this implementation, the counter determines a total measurement uncertainty for the measurement operation using a weighted average formation from the present measurement uncertainties and outputs this total measurement uncertainty.

According to a second teaching of the present invention, the object mentioned in the beginning is achieved by a flowmeter mentioned in the introduction in that the error unit is designed such that it determines a present measurement uncertainty for each individual measured value and that the error unit links the measurement uncertainties from static and dynamic error sources to one another by error propagation for determining the present measurement uncertainty.

A first design of the flowmeter is wherein it has a display unit for displaying the individual measured values and the associated present measurement uncertainty and/or that it has an interface for external output.

According to a further design of the flowmeter, it has an additional sensor unit for detecting at least one present operating parameter and/or an interface for input of at least one present operating parameter.

According to a further design of the flowmeter according to the invention, the flowmeter has a counter, wherein the counter outputs the total flow of a temporally limited measurement operation. Additionally, the counter is designed so that it integrates the individual measured values of the flow over the amount of time of a temporally limited measurement operation. Furthermore, the counter is designed such that it outputs a total measurement uncertainty for the measurement operation taking into account the present measurement uncertainties. For example, the counter determines the total measurement uncertainty as a weighted average of the present measurement uncertainty.

According to a further design of the flowmeter according to the invention, the flowmeter is designed so that it carries out the above-described method in the operating state.

In detail, there is a plurality of possibilities for designing and further developing the method and the flowmeter according to the invention as will be apparent from the following description of preferred embodiments in conjunction with the accompany drawings.

DETAILED DESCRIPTION OF THE INVENTION

Figure 1:
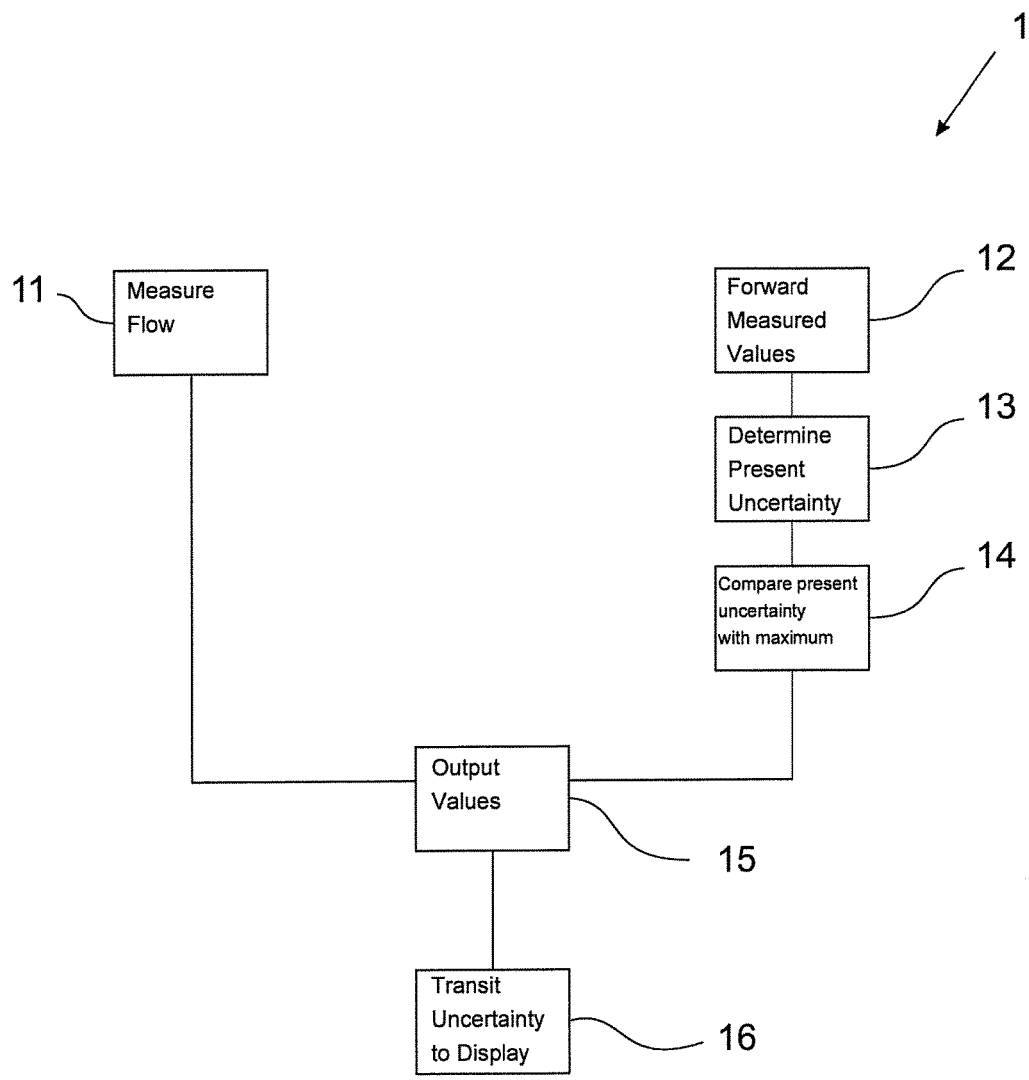
FIG. 1 is a schematic depiction of an embodiment of a method according to the invention.
Figure 2:
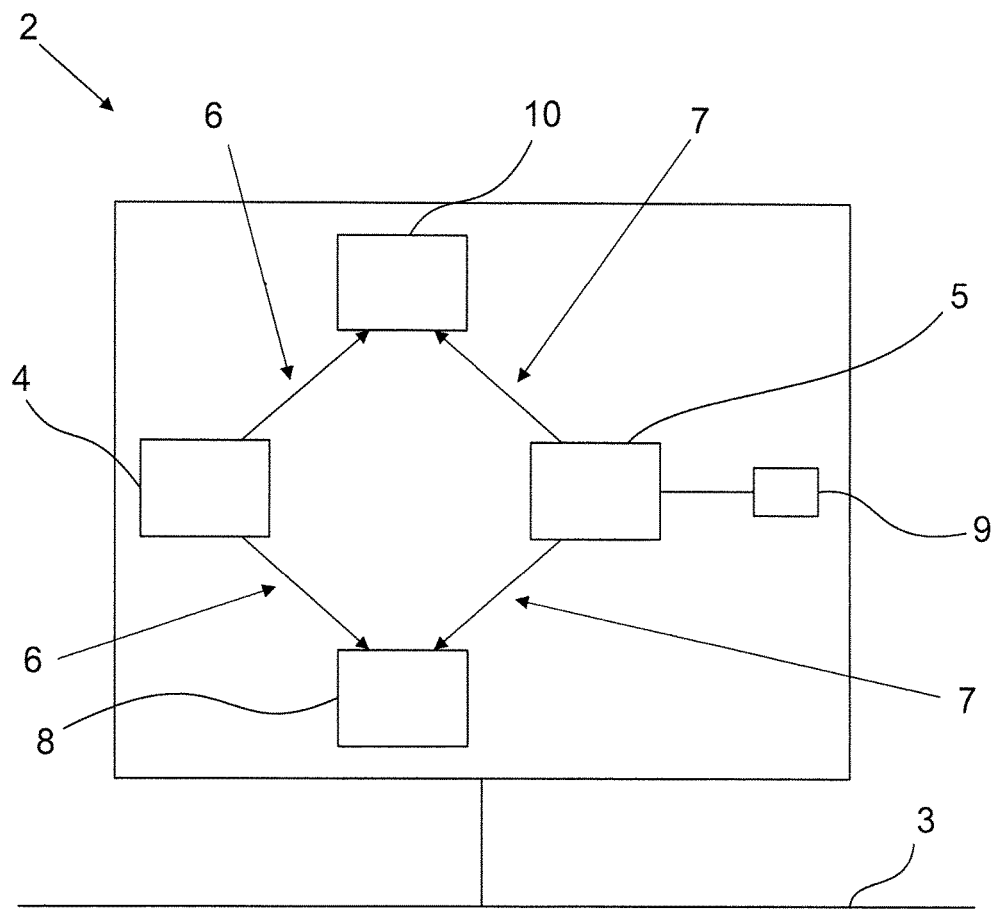
FIG. 2 is a schematic depiction of an embodiment of a flowmeter according to the invention.

FIG. 2 shows an embodiment of a flowmeter 2 in accordance with the invention and FIG. 1 shows a method 1 according to the invention for operating the flowmeter 2 for measuring the flow of a medium flowing through a pipe 3. The flowmeter 2 has a measuring unit 4 for determining individual measured values 6 of the flow and an error unit 5 for determining the present measurement uncertainty 7 of the individual measured values 6, and wherein the determination of individual measured values 6 is carried out at a measuring frequency of 100 Hz by a measuring unit 4. Additionally, the flowmeter 2 has a display unit 8 for displaying the individual measured values 6 and the associated present measurement uncertainty 7 and a sensor unit 9 for detecting the operating parameters temperature and pressure. Finally, the flowmeter 2 also has a counter 10 that integrates the individual measured values 6 over a limited amount of time, i.e., during a temporally limited measurement operation, and thus, outputs the total flow of a temporally limited measurement operation, and wherein the counter outputs a total measurement uncertainty for the total.

In a first step 11 of the method shown in FIG. 1, the determination of the flow is carried out by the measuring unit 4. Simultaneously, the relevant operating parameters are measured by the sensor unit 9 and the measured values of the operating parameters are forwarded 12 to the error unit 5. In a next step, 13, the error unit 5 determines a present measurement uncertainty 7 for the individual measured value 6 of the flow. Additionally, the measurement uncertainties resulting from calibration, reproducibility, long-term reproducibility and linearity are stored in the error unit 5. These measurement uncertainties are linked to the measurement uncertainties resulting from the variation of temperature and pressure using error propagation. For this purpose the individual measured value 6 of the flow is transferred to the error unit 5. The present measurement uncertainty 7 determined in this manner is then compared 14 to a maximum measurement uncertainty set before start-up of the flowmeter. If the present measurement uncertainty 7 exceeds the maximum measurement uncertainty, a warning is issued.

Both the individual measured value 6 of the flow and the associated present measurement uncertainty 7 as well as a warning in the case of the maximum measurement uncertainty being exceeded are forwarded to the display unit 8 and output 15 by it. It is then possible for the user to individually assess the reliability of the output individual measured values 6, whereby the quality of the measurement is substantially improved.

Furthermore, both the individual measured value 6 as well as the present measurement uncertainty 7 are transmitted 16 to the counter 10, which takes these values into account in the manner described above for determining a total flow and a total measurement uncertainty.

A flowmeter 2 is schematically represented in FIG. 2 for measuring the flow of a medium flowing through a pipe 3, having a measuring unit 4 for determining individual measured values 6 of the flow and having an error unit 5 for determining the measurement uncertainty of the individual measured values, wherein the determination of the individual measured values 6 is carried out at a measuring frequency of 100 Hz. Thereby, the error unit 5 is designed so that it determines a present measurement uncertainty 7 for each individual measured value 6. Additionally, the error unit 5 takes both static as well as dynamic error sources into account for determining the present measurement uncertainty 7 by means of error propagation.

In addition, the flowmeter has a display unit 8, to which the individual measured values 6 as well as the associated present measurement uncertainty 7 are transferred, wherein the display unit 8 is designed so that it outputs the individual measured values 6 and the associated present measurement uncertainties 7.

The illustrated flowmeter 2 allows for the reliability of the individual measured values 6 to be assessed based on the improved expression of the measurement uncertainty of the individual measured values 6, whereby the quality of the measurement is improved overall.

What is claimed is:

1. Method for operating a flowmeter for measuring the flow of a flowing medium through a pipe, comprising:
   using a measuring unit for determining individual measured values of flow of a medium through a measuring tube,
   using an error unit for determining a present measurement uncertainty of individual measured values, wherein the uncertainty measurement determination of individual measured values is carried out at a measuring frequency and using measurement uncertainties from static and dynamic error sources,
   wherein the present measurement uncertainty is determined for each individual measured value by the error unit,
   wherein measurement uncertainties from static and dynamic error sources are linked to one another by error propagation for determining the present measurement uncertainty,
   wherein a zero point stability of the flowmeter and a variation of at least one present operating parameter is used as the dynamic error source in determining the present measurement uncertainty,
   wherein the present operating parameter comprising at least an ambient condition or a pressure condition of the flowing medium,
   wherein at least one additional sensor unit is used for detecting the present operating parameter and that the at least one additional sensor unit forwards measured values of the present operating parameter to at least the error unit, and
   wherein the determined measurement uncertainties are presented in a manner enabling the accuracy of the measured values of flow to be determined.

2. Method according to claim 1, wherein the measuring unit measures volume flow or mass flow of the medium.

3. Method according to claim 1, wherein the static error sources used in determining the present measurement uncertainty include at least one of a measurement uncertainty of calibration, a measurement uncertainty of reproducibility, a measurement uncertainty of long-term reproducibility and a measurement uncertainty of linearity of the flowmeter.

4. Method according to claim 1, wherein each individual measured value and an associated present measurement uncertainty are displayed via a display unit manner enabling the accuracy of the measured values of flow to be determined.

5. Method according to claim 1, wherein the measuring frequency lies between 20 Hz and 500 Hz.

6. Method according to claim 1, wherein at least one value of an operating parameter is input via an interface and wherein the interface forwards the at least one value of the operating parameter to at least the error unit.

7. Method according to claim 1, comprising the further step of setting a maximum measurement uncertainty, wherein the present measurement uncertainty is compared by the flowmeter to the maximum measurement uncertainty and wherein a warning is issued when the maximum measurement uncertainty has been exceeded.

8. Method according to claim 1, wherein a counter outputs a total flow of a temporally limited measurement operation and wherein the counter outputs a total measurement uncertainty taking into account the present measurement uncertainty.

9. Flowmeter for measuring the flow of a medium flowing through a pipe, comprising:
   a measuring unit for determining individual measured values of the flow and an error unit for determining a present measurement uncertainty of individual measured values and an additional sensor unit for detecting at least one present operating parameter external to the flowmeter,
   wherein the determination of the individual measured values is carried out using a measuring frequency and using measurement uncertainties from static and dynamic error sources,
   wherein the error unit is adapted for determining the present measurement uncertainty for each individual measured value,
   wherein the error unit links the measurement uncertainties from static and dynamic error sources to one another by error propagation for determining the present measurement uncertainty, wherein a zero point stability of the flowmeter and a variation of the present operating parameter is used as the dynamic error source in determining the present measurement uncertainty, wherein the present operating parameter comprising at least an ambient condition or a pressure condition of the flowing medium, wherein the additional sensor unit forwards the measured values of the present operating parameter at least to the error unit, and wherein means for presenting the determined measurement uncertainties in a manner enabling the accuracy of the measured values of flow to be determined is provided.

10. Flowmeter according to claim 9, wherein the means for presenting comprises at least one of a display unit for displaying the individual measured values and associated present measurement uncertainties and an interface for external output.

11. Flowmeter according to claim 9, further comprising at least one of an additional sensor unit for detecting at least one present operating parameter or an interface for inputting of at least one present operating parameter.

12. Flowmeter according to claim 9, further comprising a counter, wherein the counter has means for outputting total flow of a temporally limited measurement operation and for outputting a total measurement uncertainty for the measurement operation taking into account the present measurement uncertainties.

* * * * *